(12) United States Patent
Le Goff et al.

(10) Patent No.: US 8,664,948 B2
(45) Date of Patent: Mar. 4, 2014

(54) MEASURING VIBRATION IN A ROTATING ELEMENT

(75) Inventors: Alexis Le Goff, Versailles (FR); Roland Blanpain, Entre-deux-Guiers (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 263 days.

(21) Appl. No.: 13/263,267

(22) PCT Filed: Apr. 8, 2010

(86) PCT No.: PCT/FR2010/050677
§ 371 (c)(1),
(2), (4) Date: Dec. 23, 2011

(87) PCT Pub. No.: WO2010/116094
PCT Pub. Date: Oct. 14, 2010

(65) Prior Publication Data
US 2012/0098528 A1  Apr. 26, 2012

(30) Foreign Application Priority Data
Apr. 8, 2009 (FR) .................................... 09 52282

(51) Int. Cl.
*G01B 7/30* (2006.01)
(52) U.S. Cl.
USPC ................................................. 324/207.25
(58) Field of Classification Search
USPC ..................................................... 324/207.25
See application file for complete search history.

(56) References Cited

U.S. PATENT DOCUMENTS

| 6,222,290 B1 | 4/2001 | Schoeb et al. |
| 6,249,067 B1 | 6/2001 | Schob et al. |
| 6,445,178 B1 | 9/2002 | Hoekstra |
| 2001/0008083 A1 | 7/2001 | Brown |
| 2003/0010107 A1 | 1/2003 | Giustino |

FOREIGN PATENT DOCUMENTS

JP      2003344205 A1    12/2003

OTHER PUBLICATIONS

International Search Report issued in PCT/FR2010/050677 on Aug. 2, 2010.
International Preliminary Report on Patentability issued on Dec. 20, 2011 in PCT/FR10/050677.

*Primary Examiner* — Bot Ledynh
(74) *Attorney, Agent, or Firm* — Vedder Price PC

(57) ABSTRACT

A system for measuring a variation in a distance of an axis of rotation of an object relative to a point in a plane perpendicular to this axis comprises at least two sensors for measuring a value representing an angular position of said object about said axis, at least a first of said sensors, whose position is fixed relative to said point, comprising a magnetometer suitable for measuring the magnetic field generated by said object whose magnetization varies around its circumference; and means for determining said variation of distance on the basis of a variation in an angular deviation between said sensors relative to the axis, from one revolution of said object to the next.

6 Claims, 5 Drawing Sheets

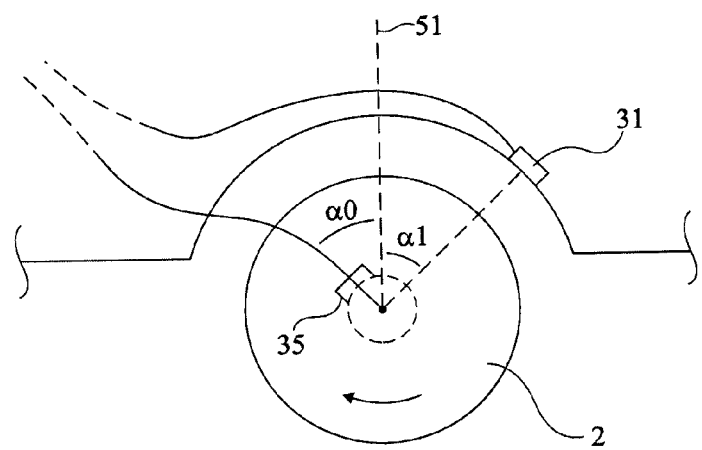
Fig 9
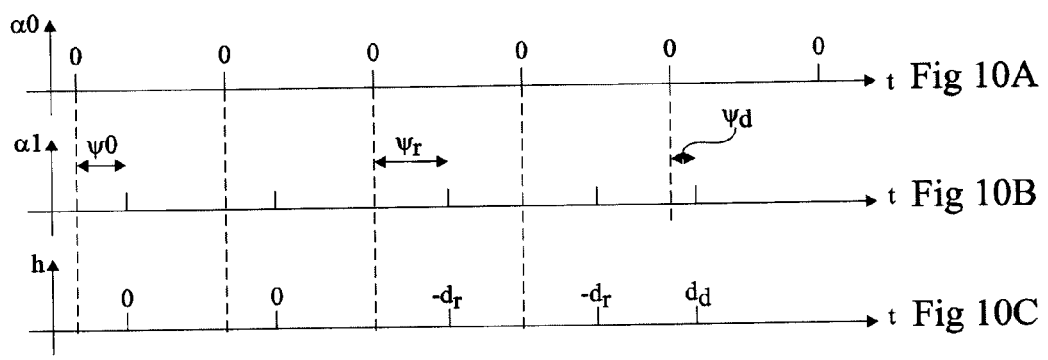
Fig 10A
Fig 10B
Fig 10C

MEASURING VIBRATION IN A ROTATING ELEMENT

FIELD OF THE INVENTION

The present invention generally relates to measurement systems and, more specifically, to the measurement of a displacement of the axis of a rotating element, in a direction perpendicular to this axis.

The present invention applies as an example to the estimation of a vertical lift of a motor vehicle wheel.

DISCUSSION OF PRIOR ART

The estimating of the vertical lift of a vehicle wheel may be used to estimate the wearing of a suspension. According to another example, this estimate is used to control the rigidity of the suspensions or to estimate the attitude excursions of the vehicle.

A first known technique to estimate the vertical lift of a wheel with respect to a vehicle frame uses a wire sensor having its respective ends connected to the wheel axle and to the frame. The sensor comprises a central coil ensuring the tension of the wire. The vertical lift is obtained by measurement of the angular position of this coil. Such a technique is expensive and difficult to implement. It is in practice reserved to tests during the vehicle manufacturing or appraisal.

Another known technique uses a light beam (typically, a laser beam) having its emitter supported by the frame and which reflects on the road. Estimating the light path enables to estimate the frame height, and thus the vertical lift of the wheels. Such a technique remains complex. Further, the results depend on the tire inflation state.

Another known technique is described in document EP-A-0617260. This technique integrates, in the wheel joint, a magnet and a sensor for measuring the wheel inclination to deduce the vertical lift therefrom. This technique requires significant modifications of the wheel joint.

Document U.S. Pat. No. 6,222,290 describes an electromagnetic drive system in which the position of the center of a rotor is obtained by electromagnetic field measurement. At least two magnetic sensors are used to estimate the rotor position from an angular determination of the rotation phase of the rotor.

It would be desirable to have a system of simple structure for estimating the vertical lift of a motor vehicle wheel. In particular, it would be desirable to require no modification on the wheel side, and no fastener on the axle side.

More generally, it would be desirable to have a system for estimating a displacement of an object in a direction perpendicular to a rotation axis of this object.

SUMMARY

An object of an embodiment of the present invention is to overcome all or part of the disadvantages of known systems for estimating the travel of a rotating element.

An object of an embodiment of the present invention is to provide a system requiring no intervention on the wheel or on the axle.

More generally, an object of an embodiment of the invention is to provide a system for measuring a displacement of an element in a direction perpendicular to its rotation axis.

To achieve all or part of these and other objects, the present invention provides a system for measuring a variation of the distance of a rotation axis of an object with respect to a point in a plane perpendicular to this axis, comprising:

at least two sensors capable of measuring information representative of an angular position of said object around said axis, at least a first one of said sensors, of fixed position with respect to said point, comprising a magnetometer capable of measuring the magnetic field emitted by said object which has a variable magnetization over its circumference; and means for determining said variation of the distance based on a variation of the angular distance between said sensors with respect to the axis, from one revolution to another of said object, said means exploiting a time shift between responses of the two sensors.

According to an embodiment of the present invention, said means detect, in a response signal of said first sensor, at least one first characteristic magnetic amplitude for each revolution of said object.

According to an embodiment of the present invention, at least one second sensor, of fixed position with respect to said point, comprises a second magnetometer, and the two sensors are not aligned with said point.

According to an embodiment of the present invention, said means detect, in a response signal of said second sensor, said first characteristic magnetic amplitude.

According to an embodiment of the present invention, said means estimate the time interval between the occurrence of said characteristic magnetic amplitude in the respective responses of said sensors, and deduce said angular distance variation therefrom.

According to an embodiment of the present invention, a second sensor, of fixed position with respect to said axis, determines a reference angular position of said object.

According to an embodiment of the present invention, said means estimate a variation of the angular distance between a position representative of said characteristic magnetic amplitude in the response of the first sensor and said reference angular position.

According to an embodiment of the present invention, the system is applied to a measurement of the vertical lift of a motor vehicle wheel.

The present invention also provides a method for measuring a distance variation between a rotation axis of an object with respect to a point in a plane perpendicular to this axis, comprising the steps of:

measuring first information representative of an angular position of said object around said axis by means of a first sensor, of fixed position with respect to said point, and comprising a magnetometer capable of measuring the magnetic field emitted by said object which has a variable magnetization over its circumference;

measuring second information representative of an angular position of said object around said axis by means of a second sensor;

estimating a variation of the angular distance between said sensors with respect to the axis, from one revolution to another of said object by exploiting a time shift between responses of the two sensors; and deducing therefrom a variation of said distance.

BRIEF DESCRIPTION OF THE DRAWINGS

The foregoing and other objects, features, and advantages of the present invention will be discussed in detail in the following non-limiting description of specific embodiments in connection with the accompanying drawings, among which:

FIG. 9 is a simplified lateral view of a wheel associated with still another embodiment of a vertical lift estimating system; and FIGS. 10A, 10B, and 10C are timing diagrams illustrating the operation of the system of FIG. 9.

The same elements have been designated with the same reference numerals in the different drawings.

DETAILED DESCRIPTION

Figure 1:
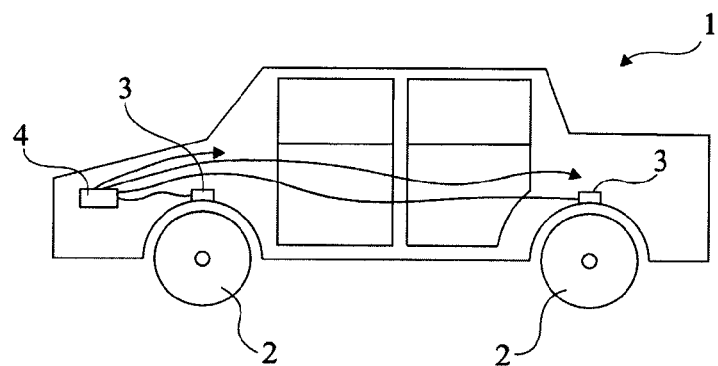
FIG. 1 is a simplified view of a motor vehicle equipped with a system according to an embodiment of the present invention.

For clarity, only those steps and elements which are useful to the understanding of the invention have been shown in the drawings and will be described. In particular, the details constitutive of a usual steel-ply or -belted tire to which the present invention applies as an example have not been discussed, the invention being compatible with any steel-ply and/or -belted tire. Further, what exploitation is made of the measurements has not been detailed either, the invention being compatible with any usual application of such measurements. Unless otherwise specified, the terms indicating a direction (vertical, horizontal, etc.) and a relative position (under, above, etc.) are arbitrarily expressed in the orientation of the drawings.

The embodiments of the present invention which will be described take advantage from the existence, in a motor vehicle tire, of a metal belt made of a ferromagnetic material, most often steel, thus having a remanent magnetization due to the magnetic fields to which the steel has been submitted. This metal belt is integrated in the tire rubber at the level of its tread.

More generally, these embodiments apply to rotating elements capable of having an uneven magnetization on their circumference, so that an angular position can be determined by a measurement of the magnetization.

FIG. 1 is a very simplified lateral view of a motor vehicle 1 equipped with a system for estimating the vertical lift of its wheels. Each wheel 2 of the vehicle is assumed to be equipped with a device 3 for measuring the vertical lift and the different measurements are assumed to be collected by a centralizing device 4, for example, the vehicle on-board computer. The representation of FIG. 1 is simplified and only shows two devices 3.

Figure 2:
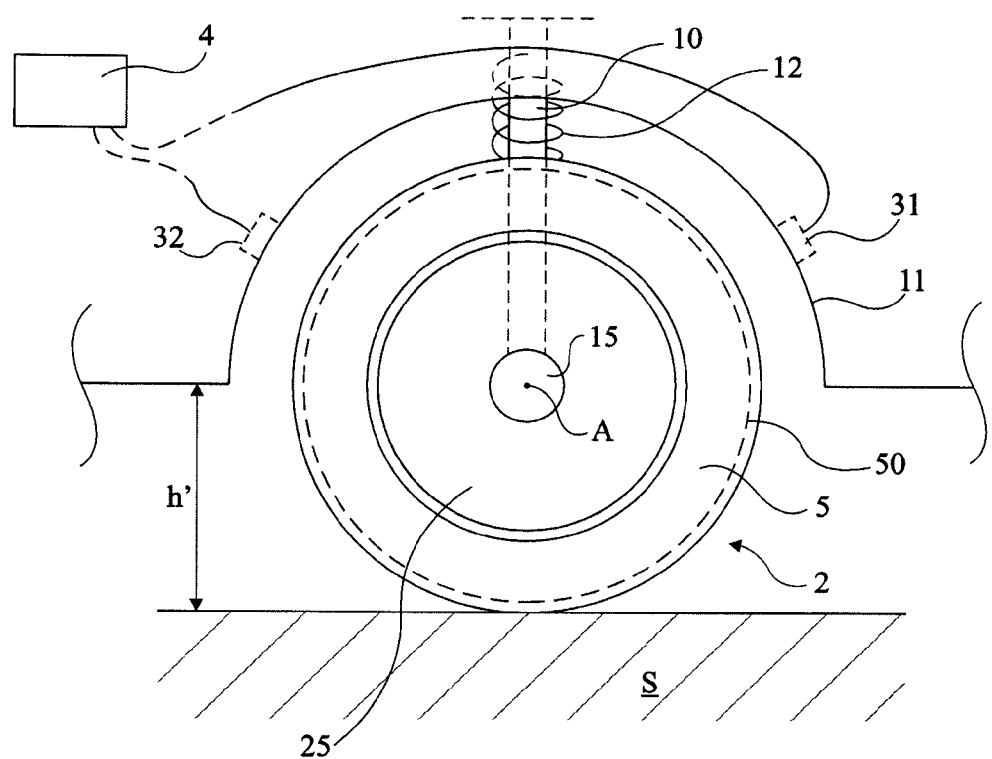
FIG. 2 is a simplified view of a detail of the system at the level of a wheel of the vehicle.

FIG. 2 shows an enlargement at the level of a wheel 2 of the vehicle of FIG. 1. Generally, a rim 25 of the wheel 2 is assembled on a hub 15 supported by an arm 10 connected to frame 11 of the vehicle via a damper and spring system (symbolized by a spring 12). When the vehicle is running, height h' of frame 11 with respect to ground S varies according to the compression of the suspensions and to the compression of the tire. The variation around an idle position represents the vertical lift of the wheel in operation. Many damping mechanisms (possibly controlled) are known and the described embodiments apply to any wheel undergoing a vertical lift.

In the example of FIG. 2, rim 25 supports a tire 5 comprising a metal belt 50. The magnetization of belt 50 depends on the history of the tire and on the magnetic fields to which it has been submitted, in particular on manufacturing. Further, the inventor has observed that this magnetization is variable over the tire circumference.

Device 3 of FIG. 2 comprises two magnetometers 31 and 32 supported by an element which is fixed with respect to the vehicle frame, for example, by the actual frame or by a body element (the inside of a fender at the wheelhouse level). Since the tire magnetization is not even, the magnetic value measured by each magnetometer varies as the wheel rotates. Such variations, which are a function of the angular position of the wheel, define a periodic magnetic signature of the tire which repeats from one revolution to the other.

Figure 3:
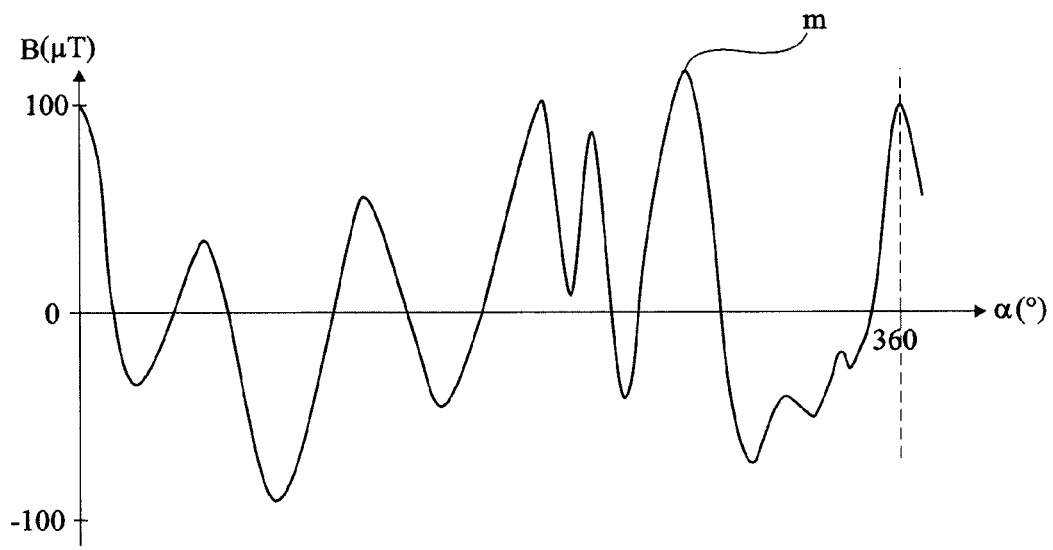
FIG. 3 is an example of the shape of the magnetic field of a vehicle wheel according to an angular position.

FIG. 3 shows an example of variation of the intensity of the magnetic field (in microtesla, $\mu T$) measured at a fixed distance from the wheel axis according to an angular position $\alpha$ in degrees(°). The representation of FIG. 3 arbitrarily identifies angular positions between 0 and 360 degrees as well as an order of magnitude of the magnetic field amplitude. This amplitude of course depends on the distance of the magnetometer from the tire surface. Similarly, the reference level at 0 microtesla is arbitrary and depends on the magnetometer sampling.

The magnetic field measured by each magnetometer is influenced by all the metal elements of the wheel (in particular the rim if it is made of steel). However, even the remanent magnetization of the rim may be variable, thus taking part in the variation of the magnetic field measurable on the wheel circumference. In the application to motor vehicles, it can be considered that in practice, if the magnetometer is placed in the direction of a radius of the wheel at a distance from axis A representing less than 2 times the radius, it is capable of detecting a field variation according to the angular position of the wheel. More generally, the rule for the positioning is that the rotating element can be considered, as seen from the magnetometer, as having a magnetization variable according to its angular position around its rotation axis. This distance of course depends on the magnetometer sensitivity.

When the wheel rotates, each sensor thus measures the wheel signature, but with a time shift.

Figure 4:
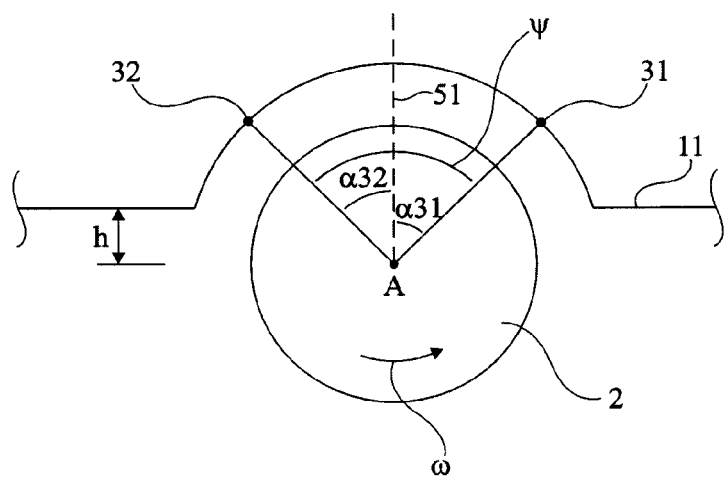
FIG. 4 is a theoretical representation of the measurement system.

FIG. 4 is a simplified representation illustrating the operation of the measurement system of FIG. 2. The two magnetometers are symbolized by points identified by reference numerals 31 and 32. Assuming a counterclockwise rotation of wheel 2, a characteristic point of the magnetic signature is detected by sensor 31 and then, with a delay $\tau$, by sensor 32. "Characteristic point" designates a point of the signature that can be detected in the sensor response for each revolution of the wheel. Preferably, this point will be the amplitude maximum (m, FIG. 3) or minimum. Delay $\tau$ between the occurrence of maximum m on magnetometer 32 with respect to its occurrence on magnetometer 31 depends on rotation speed $\omega$ of the wheel and on angle $\psi$ between the vectors connecting center A of the wheel to points 31 and 32, respectively. Now, angle $\psi$ depends on height h between axis A and frame 11 (or between axis A and any fixed point with respect to sensors 31 and 32). In the example of FIG. 4 where axis A is assumed to be under the straight line connecting points 31 and 32, the lower height h, the wider angle ψ and the greater delay τ. If axis A moves to the other side of the straight line connecting points 31, 32, the amplitude of the interval between axis A and the intersection of this straight line with vertical direction 51 with respect to the axis increases with a narrowing of angle ψ, and thus with a decrease in the delay. The time reference required to estimate the delay, and thus the angular variation, may be obtained in different ways (measurement of the wheel rotation speed, direct obtaining of the angular positions as a function of time, etc.), examples of which will be described hereafter.

For simplification, it is assumed that sensors 31 and 32 are in a plane perpendicular to axis A. However, what will be described transposes to the case where the sensors are offset in the plane perpendicular to the axis. An amplitude correction will then be necessary to scale the different signals.

The position of magnetometers 31 and 32, and more specifically their distance from vertical direction 51 with respect to axis A, conditions the accuracy of the measurements. The more distant the sensors are from one another, the better the definition for a given resolution. Preferably, the two magnetometers have symmetrical positions with respect to vertical direction 51 with respect to axis A of the wheel. Ideally, magnetometers 31 and 32 are positioned so that the idle position (no lift) corresponds to a 180° angle (magnetometer horizontally aligned with axis A). To simplify the discussion, it is assumed that angles $\alpha 1$ and $\alpha 2$, between the radial directions in which respective magnetometers 31 and 32 are placed, and the direction in which the lift is measured (in the example, the vertical direction) are equal. In practice, these angles may be different, provided to adapt the processings carried out on the electric signals provided by the sensors to adjust the scale of the measured angular variations and thus compensate for the angular difference. It will however be ascertained for sensors 31 and 32 not to be both aligned on the direction of the lift to be measured since there then would be no delay in the occurrence of a same point of the magnetic signature on the response of the two sensors.

Magnetometers 31 and 32 are preferably equidistant from the tire periphery. If not, the processings carried out on the electric signals provided by the sensors will be adapted to adjust to a same scale the amplitudes of the measured magnetic fields and thus compensate for the distance difference.

In practice, the selection of the sensor positions on the vehicle frame depends on the vehicle type and on the available locations.

Figure 5:
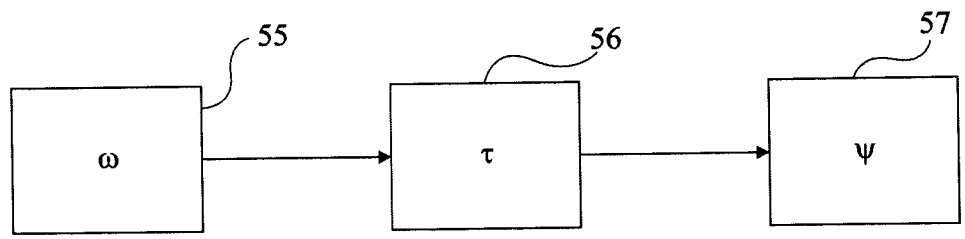
FIG. 5 is a block diagram illustrating steps implemented by an electronic calculator of an embodiment of a vertical lift estimating system.

FIG. 5 shows in the form of blocks an embodiment of the method for measuring the vertical lift in the system of FIGS. 2 and 4.

In this example, the time reference enabling to estimate the delay between the occurrence of the characteristic point of the magnetic signature (for example, the maximum or the minimum) is the wheel rotation speed. Rotation speed ω can be obtained (block 55) in different ways. For example, this speed is deduced by the on-board computer from the vehicle speed. According to another example, the speed is provided by a speed sensor integrated in the wheel and further exploited by the on-board computer (typically, for the ESP or "Electronic Stability Program", with which more and more vehicles are equipped).

Delay τ between the occurrence of the same point (in the example, the maximum) on the signature measured by the two sensors is determined (block 56) by a detection of the maximum in the respective responses of sensors 31 and 32.

Finally (block 57), angle ψ is deduced by calculating the ratio of delay τ to speed ω. The unit in which the angle is obtained depends on the angular speed unit.

Figure 6A:
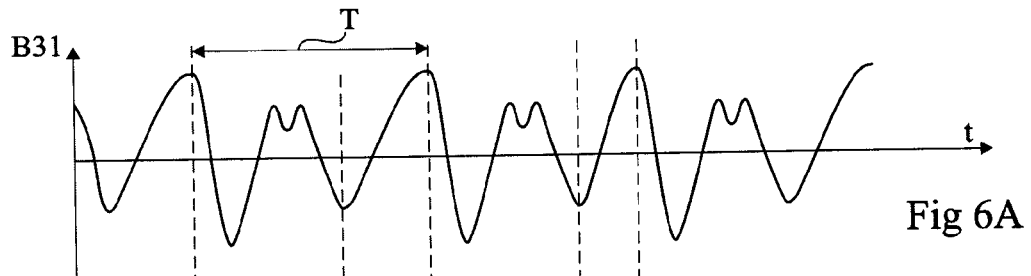
FIGS. 6A and 6B are timing diagrams illustrating the operation of a variation of the embodiment of FIG. 5.
Figure 6B:
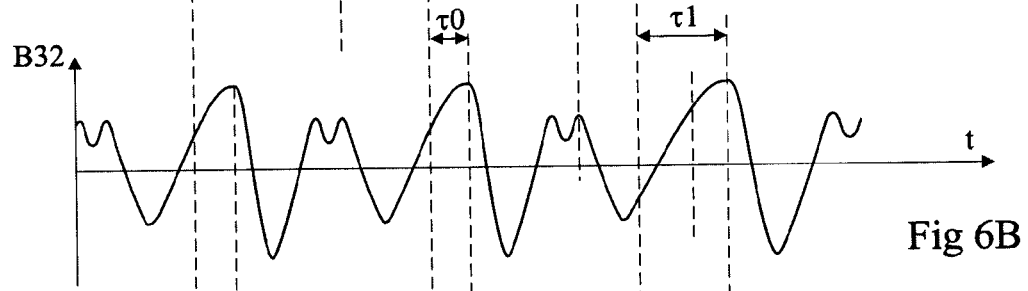

FIGS. 6A and 6B are timing diagrams of examples of electric responses B31 and B32 of magnetometers 31 and 32 illustrating a variation of the embodiment of FIG. 5, providing a local time reference at the wheel level while making the system independent from other sensors. Period T (FIG. 6A) of the magnetic signature is extracted from the response (for example, B31) of one of the magnetometers by determining the time interval between two successive occurrences of a characteristic point. This time interval is determined by the calculation based on the received signals. The calculator then determines the angular speed ($\omega = 360/T$ or $2\pi/T$). Steps 56 and 57 are not modified.

The measurement can be made more reliable by taking into account several characteristic points to avoid errors caused by possible magnetic disturbances capable of masking an occurrence of a maximum or minimum point.

In the example of FIGS. 6A and 6B, it is assumed that a delay $\tau_0$ corresponds to the idle position (no lift) illustrated by the first period of responses B31 and B32. The wheel is assumed to rotate at constant speed and to move up in the second wheel revolution. Maximum m is thus detected sooner by sensor 31 and later by sensor 32 with respect to the previous period. The delay between the occurrence of the maximum in the two responses then takes a value $\tau_1$ (greater than delay $\tau_0$).

Although, for simplification, the above examples have been discussed in relation with a technology corresponding more to an analog technology, the different steps will in practice be preferentially performed after sampling of the signals in a digital technology.

Figure 7:
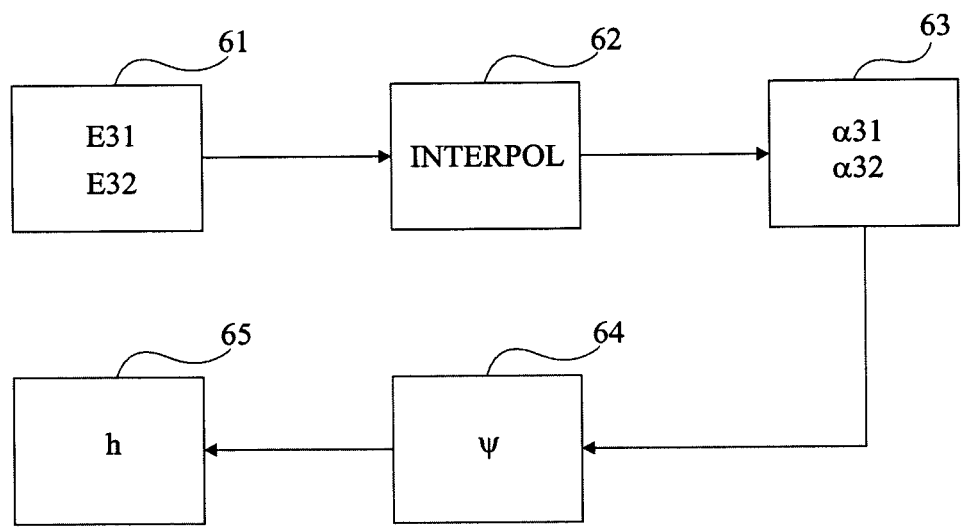
FIG. 7 is a block diagram illustrating steps implemented by an electronic calculator of another embodiment of a vertical lift estimating system.

FIG. 7 is a block diagram illustrating steps implemented by an electronic calculator of another embodiment of a vertical lift estimating system.

FIGS. 8A, 8B, 8C, 8D, 8E, and 8F are timing diagrams illustrating the operation of the embodiment of FIG. 7. Electric responses B31 and B32 identical to those of FIGS. 6A and 6B are assumed.

Figure 8A:
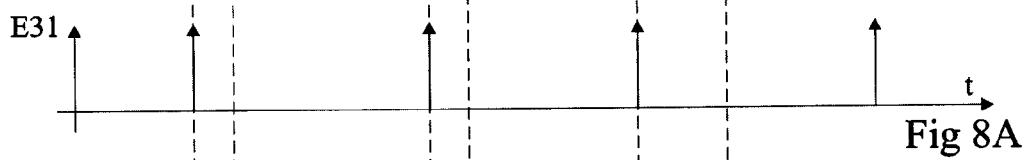
FIGS. 8A, 8B, 8C, 8D, 8E, and 8F are timing diagrams illustrating the operation of the embodiment of FIG. 7.
Figure 8B:
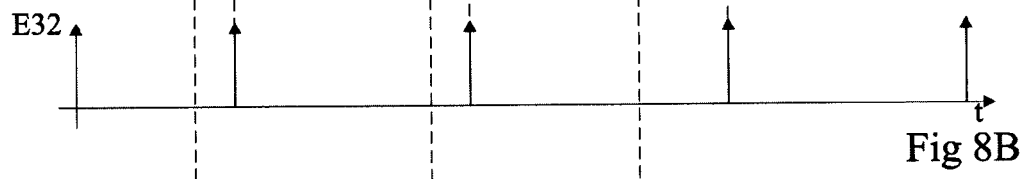

Responses B31 and B32 of the sensors are sampled and the successive times of occurrence of a same characteristic point (for example, maximum m) are detected (block 61, FIG. 7) in the sampled responses of the two sensors, as illustrated by courses E31 (FIG. 8A) and E32 (FIG. 8B).

Figure 8C:
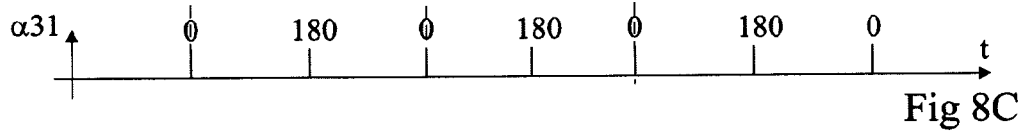
Figure 8D:
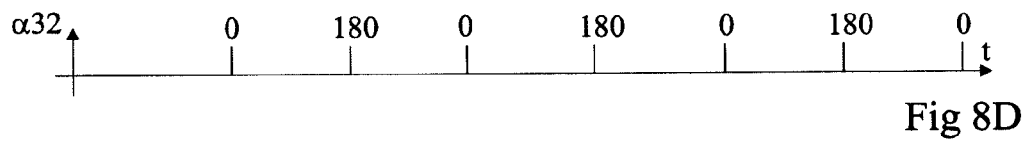

Then (block 62, INTERPOL), a linear interpolation is performed to obtain (block 63), for each sensor, angular position $\alpha 31$ (FIG. 8C) and $\alpha 32$ (FIG. 8D) as a function of time. The origin (angle 0) is arbitrarily taken at the times of occurrence of the maximum points. FIGS. 8C and 8D illustrate the intermediate 180° angles.

Figure 8E:
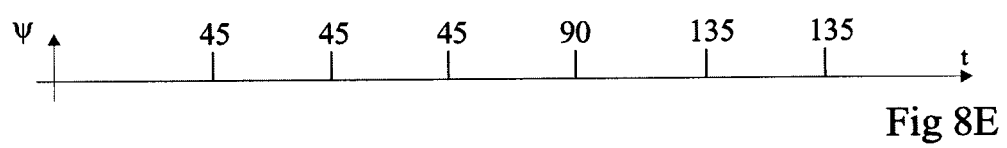
Figure 8F:
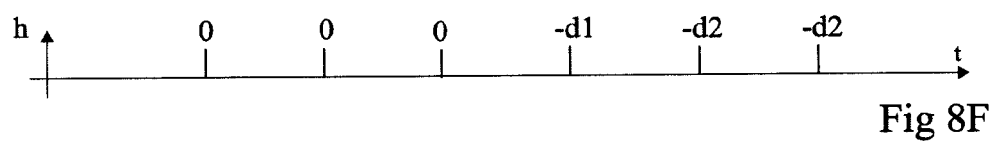

The difference between angles $\alpha 31$ and $\alpha 32$ is then calculated (block 64) to obtain angle ψ (FIG. 8E). In the example, the system is assumed to determine the angle twice per wheel rotation period (at angular positions 0 and 180° of sensor 32). The angle for example successively takes, in degrees, values 45, 45, 45, 90, 135, 135, etc.

Finally (block 65, FIG. 7), vertical lift h (FIG. 8F) is deduced from angle ψ. Since the example of FIGS. 8A to 8F uses the courses of FIGS. 6A and 6B, lift h is zero for the first three exploited samples, then has a first value $-d_1$ (a negative value is arbitrarily considered when the wheel moves up with respect to its reference position), and then a value $-d_2$.

As compared with the example described in relation with FIG. 5, FIGS. 8A to 8D show that the system resolution depends on the number of measurement samples taken into account (intermediate lift $-d_1$ when the wheel moves up is detected by the intermediate position at 180°).

The sampling frequency of responses B31 and B32 of the sensors is selected according to the expected maximum wheel rotation speed so that a sufficient number of samples enable to isolate at least one characteristic point per revolution, to obtain at least one estimate of the lift per revolution of the wheel.

For the application to motor vehicles, the resonance frequency of a suspension is on the order of one Hz. Taking into account one estimate per revolution already provides a satisfactory result as soon as the vehicle runs at more than approximately 15 km/h. In practice, it will be preferred to take at least one hundred samples per second to make the characteristic point detection more reliable.

Although a constant wheel rotation speed has been considered in the above timing diagrams, the described technique provides the lift whatever the rotation speed, the lift measurement being obtained by taking this speed into account.

FIG. 9 is a simplified lateral view of a wheel associated with still another embodiment of a vertical lift estimating system.

FIGS. 10A, 10B, and 10C are timing diagrams illustrating the operation of the system of FIG. 9.

In this example, a single magnetometer 31 is used to measure the magnetic signature. A reference angular position is provided by a non-magnetic sensor 35 supported by the wheel and capable of providing, as a function of time, an angular reference $\alpha_0$ with respect to the vertical direction. As illustrated in FIG. 10A, the period of occurrence of the reference (arbitrarily noted 0°) is independent from the vertical lift of the wheel. Of course, it depends on the wheel rotation speed, which has been considered as steady for simplification. Sensor 31 provides an angular response $\alpha 1$ (FIG. 10B) representative of the occurrences of a characteristic point of the signature. Lift h (FIG. 10C) can be deduced from the variation of angle $\psi$ ($\alpha_0 + \alpha_1$). As compared with the previous embodiments, angle $\psi$ taken into account to estimate the lift only widens and arrows on one side of vertical direction 51 with respect to the wheel axis.

In FIGS. 10B and 10C, the wheel is assumed to move up in the third and fourth revolutions (angle $\psi_r$, distance $-d_r$) and to move down in the fifth revolution (angle $\psi_d$, distance $+d_d$), with respect to an idle position (angle $\psi_0$, distance 0) in the first and second revolutions.

As in the embodiment with two magnetic sensors, a time shift between the responses of the two sensors is exploited, the response of sensor 35 here providing a reference.

Whatever the embodiment, the obtaining of lift h from the variation of angular distance $\psi$ or $\alpha 1$ requires either a sampling (for example, by a training procedure), or a geometric calculation taking into account the sensor positions and the angular position of the axis (of the wheel) in the idle state.

The wheel must however rotate to make the measurement possible.

Even if the characteristic points used on the signatures are different between sensors 31 and 32 (for example, the minimum for sensor 31 and the maximum for sensor 32, determining the distance between these characteristic points on the signature is sufficient to enable to perform the calculation.

According to another alternative embodiment, a third sensor (magnetometer) is used to measure another angular position. Accuracy is thus gained due to the redundancy obtained in the measurements.

An advantage of the described embodiments is that they require no modification of existing tires. Further, the described embodiment require no modification of existing rims and hubs, provided to use an angular sensor already present on the wheel in embodiments using a non-magnetic sensor.

Further, the measurement is independent from the tire inflation pressure since estimation is performed on the position of the axis with respect to the frame. If the tire is deflated, the amplitude of the measured signals decreases since the distance between the tire and the sensor increases, but the magnetic signature keeps a maximum and a minimum.

The remanent magnetization of the metal belt of the tire (and more generally of the wheel) risks undergoing modifications during the tire lifetime. This has no incidence on the operation of the present invention since the magnetic field measurable at the wheel periphery will always have characteristic points (maximum and minimum). Further, in embodiments using at least two magnetometers, the system adaptation is automatic. In embodiments using a single magnetic sensor, this requires a periodic sampling of the system to correct, if need be, the distance between the reference position and the characteristic point.

As a variation, the tire is submitted to a controlled magnetic field providing it an uneven magnetization on manufacturing. This enables to increase the magnetization, and thus the intensity of the signal detected by the magnetometers. Further, if desired, it may be provided for the magnetization to generate a sinusoid-shaped signature. It then becomes simpler to measure the lift from a measurement of the phase-shift between the sensed signals.

It should be noted that the magnetometers detect the terrestrial magnetic field. This has no incidence on the estimate since it is possible to suppress the D.C. component of the signature by centering the signal for each revolution of the wheel.

Although the present invention has been more specifically described in relation with an application to a motor vehicle wheel, it more generally applies as soon as a rotating element has a magnetic signature varying according to its angular position with a sufficient amplitude to be detected by a fixed magnetometer in a plane perpendicular to the axis in which the lift is desired to be measured. In particular, this lift is not necessarily vertical, provided to be in a given direction. Further, the variable character of the magnetization may result from an inhomogeneity of the magnetization in a solid cylinder. Such an inhomogeneity may originate from the inside of a circular cylinder or from irregularities in the cylinder surface.

For example, such a determination may be carried out on a solid metal roller, provided for its magnetic signature to vary over its circumference. Thus, the present invention may be used to measure a variation of the distance to the rotation axis of a roller of a machine of an industrial installation in the plane perpendicular to this axis.

Various embodiments with different variations have been described hereabove. It should be noted that those skilled in the art may combine various elements of these various embodiments and variations without showing any inventive step. Further, the practical implementation of the present invention and the calculations to be performed by computer means or electronic calculators, properly programmed or configured to organize the control of the sensors and the storage and processing of the measurements by adapted means, is within the abilities of those skilled in the art based on the functional indications given hereabove.

The invention claimed is:

1. A system for measuring a variation of the distance of a rotation axis of an object with respect to a point in a plane perpendicular to this axis, comprising:
   at least two sensors capable of measuring information representative of an angular position of said object around said axis, each sensor having a fixed position with respect to said point and comprising a magnetometer capable of measuring the magnetic field emitted by said object which has a variable magnetization over its circumference; and means for determining said variation of the distance based on a variation of the angular distance between said sensors with respect to the axis, from one revolution to another of said object, said means exploiting a time shift between extrema in the responses of the two sensors.

2. The system of claim 1, wherein said means detect, in a response signal of said sensors, at least one extremum in the magnetic signature for each revolution of said object.

3. The system of claim 1, wherein the two sensors are not aligned with said point.

4. The system of claim 2, wherein said means estimate the time interval between the occurrence of said extremum in the respective responses of said sensors, and deduce said angular distance variation therefrom.

5. The system of claim 1, applied to a measurement of the vertical lift of a motor vehicle wheel.

6. A system for measuring a variation of the distance between a rotation axis of an object with respect to a point in a plane perpendicular to this axis, comprising the steps of:

measuring first information representative of an angular position of said object around said axis by means of a first sensor, of fixed position with respect to said point, comprising a magnetometer capable of measuring the magnetic field emitted by said object which has a variable magnetization over its circumference;

measuring second information representative of an angular position of said object around said axis by means of a second sensor having a fixed position with respect to said point and comprising a magnetometer capable of measuring the magnetic field emitted by said object;

estimating a variation of the angular distance between said sensors with respect to the axis, from one revolution to another of said object by exploiting a time shift between extrema in the responses of the two sensors; and deducing therefrom a variation of said distance.

* * * * *